US008382516B2

(12) United States Patent
Vanyek (10) Patent No.: US 8,382,516 B2
(45) Date of Patent: Feb. 26, 2013

(54) ADAPTABLE CONFIGURATION PLUG IN A VEHICLE ENTERTAINMENT SYSTEM (75) Inventor: Gary E. Vanyek, Laguna Niguel, CA (US)

(73) Assignee: Thales Avionics, Inc., Irvine, CA (US)

( * ) Notice: Subject to any disclaimer, the term of this patent is extended or adjusted under 35 U.S.C. 154(b) by 1182 days.

(21) Appl. No.: 12/244,092

(22) Filed: Oct. 2, 2008

(65) Prior Publication Data
US 2010/0088731 A1 Apr. 8, 2010

(51) Int. Cl.
H01R 13/60 (2006.01)
(52) U.S. Cl. ............... 439/540.1; 361/826; 361/827
(58) Field of Classification Search ............... 439/540.1, 439/607.23–607.25; 361/826, 827
See application file for complete search history.

(56) References Cited

U.S. PATENT DOCUMENTS

| 5,348,482 | A | 9/1994 | Rudy, Jr. et al. | |
|---|---|---|---|---|
| 6,058,288 | A | 5/2000 | Reed et al. | |
| 6,249,913 | B1 | 6/2001 | Galipeau et al. | |
| 6,394,815 | B1 | 5/2002 | Sarno et al. | |
| 6,504,730 | B1 * | 1/2003 | Cooney et al. | 361/826 |
| 6,535,397 | B2 * | 3/2003 | Clark et al. | 361/788 |
| 6,561,454 | B1 | 5/2003 | White, III | |
| 6,661,664 | B2 * | 12/2003 | Sarno et al. | 361/719 |
| 6,666,400 | B2 | 12/2003 | White, III | |
| 6,801,769 | B1 * | 10/2004 | Royalty | 455/431 |
| 6,967,830 | B2 * | 11/2005 | Cooper et al. | 361/679.32 |
| 7,180,751 | B1 * | 2/2007 | Geschke et al. | 361/788 |
| 7,286,365 | B2 * | 10/2007 | Sarno et al. | 361/721 |
| 7,338,376 | B2 | 3/2008 | Eck et al. | |
| 7,756,145 | B2 * | 7/2010 | Kettering et al. | 370/401 |
| 8,107,244 | B2 * | 1/2012 | Reimund | 361/729 |
| 8,116,095 | B2 * | 2/2012 | Dorenkamp et al. | 361/788 |
| 2003/0031419 | A1 | 2/2003 | Simmons et al. | |
| 2003/0064714 | A1 | 4/2003 | Sanford et al. | |
| 2004/0235469 | A1 | 11/2004 | Krug | |
| 2005/0047065 | A1 | 3/2005 | Cooper et al. | |
| 2006/0143661 | A1 | 6/2006 | Funderburk et al. | |
| 2007/0077998 | A1 | 4/2007 | Petrisor | |

FOREIGN PATENT DOCUMENTS

| EP | 1 469 652 A1 | 10/2004 |
|---|---|---|
| FR | 2 783 392 A1 | 3/2000 |
| WO | WO 90/15508 A1 | 12/1990 |

OTHER PUBLICATIONS

Communication pursuant to Article 94(3) EPC, EPO Patent Application No. 09 171 371.9, Apr. 23, 2012.

* cited by examiner

Primary Examiner — Briggitte R Hammond
(74) Attorney, Agent, or Firm — Myers Bigel Sibley & Sajovec, P.A.

(57) ABSTRACT

A multimedia delivery system of a vehicle is provided comprising a passive configuration plug designed as a line-replaceable unit that permits quick and easy reconfiguration based on changing needs of the vehicle owner. The system comprises a plurality of multimedia servers comprising multimedia data files, a plurality of end user display devices that display information from the multimedia servers, and a configuration plug designed as a line-replaceable unit comprising: a frame, one or more covers connected to the frame, a plug mount comprising an end-user device plug and a server plug, wherein both the device plug and the server plug each contain a plurality of cable connectors, a plurality of cables, each connecting to a connector of the device plug on one end, and a connector of the server plug on an other end, the connections defining a cable mapping between the devices and the servers.

14 Claims, 8 Drawing Sheets

ADAPTABLE CONFIGURATION PLUG IN A VEHICLE ENTERTAINMENT SYSTEM

BACKGROUND

In a typical aircraft design, in-flight entertainment (IFE) systems comprise components designed to deliver multi-media content to passengers. These components include, at a basic level, the servers containing the media content, the passenger display systems, and a networking infrastructure that connects the servers to the display systems.

If all content being sent to the passengers was identical, a very simplistic system and network could be utilized. However, given the fact that modern passengers are provided with not only an opportunity to receive multimedia content from one of several channels, but also on-demand videos, the complexity of the system is greatly increased, and the demands on the network infrastructure are high. Generally, the only practical way to design at least the fundamental networking components of such a system is to use fiber optics or high-capacity wire as the medium via which the high volume of data is sent.

In a typical airplane configuration, the servers and other "head-end" equipment have been grouped together in a centralized common general location and provided in enclosures called IFE center (IFEC) racks or cabin equipment centers (CEC). Communications are routed from this centralized location to various area distribution boxes (ADBs) throughout the airplane. These are then routed to the individual locations at which a multimedia display of the multimedia data is desired.

Each of the servers typically have a set of fiber optic outputs and each of the ADBs has a set of fiber optic inputs. Depending on the size and configuration of the airplane, the number of ADBs can vary considerably, e.g., ranging from five to twelve. Furthermore, the number of servers can vary considerably as well, e.g., ranging from two to ten servers. Although it seems that the interconnection and running fibers between the servers and the ADBs should be a straightforward matter, it is, in fact, somewhat complex, since factors such as redundant coverage and a balancing of client loads across servers must be taken into account.

A further issue is that it is desirable to install the same basic system on airplanes of different sizes and configurations, meaning that a custom-made fiber optic harness connecting the servers and the CEC or IFEC output disconnects must be made that varies from plane to plane and based on customer requirements. With a particular customer configuration, a unique fiber optic schematic is provided and a unique fiber optic bundle is made inside of the rack so that the correct and optimal distribution to the ADB fiber optic feeds can be made; these are laid inside of the aircraft fuselage by the airfraimer, and then they are brought to the equipment cabinet.

This is problematic because one needs a unique fiber optic harness for almost every design (depending on the number of servers the customer wants, and other configuration parameters). Almost every internal rack design is a point design (unique), so there is a lot of nonrecurring engineering associated with each head-end rack design. Also, if a mistake is made or an optimizing redesign is desired, the connections between the servers and the ADBs have to change, and if the harness has already been made and installed, is a very time consuming and costly job just to access it, make the changes, install them, and close up. And during this time, the IFE is unavailable—the rack (which is large) must be removed. Finally, if the customer wants to change the configuration (e.g., change the seat count or seat configuration, or change a level of service, such as going to high-definition MPEG, which takes more bandwidth and requires more servers), again this is a big job.

Many planes are bought by leasing companies, so when a plane goes from a first lessee to a second lessee, the latter may want to completely revamp the configuration/cabin due to different business plans, etc. Therefore, one could go from a high end service, with video screens at every seat, to a low end service, where the client simply wants audio at the seat with an overhead monitor (this could change the server requirement from six to two).

SUMMARY

The present invention addresses the problems of the prior art identified above by providing a system in which all of the fiber optic cables from the ADBs and all of the fiber optic cables are brought together in a common and easily accessible passive interconnection box or a configuration plug, and then are interconnected using looping fiber cables within the configuration plug. The passive nature of the configuration plug greatly simplifies the interconnections over computer-based switches and is able to handle extremely high bandwidth transmission of data that is not limited by hardware component devices/software and has fewer failure modes than traditional electronic switches.

Various embodiments of the invention are discussed below. It should be noted that although the configuration is discussed in conjunction with an embodiment related to in-flight entertainment (IFE) systems, and that the context is use in an airplane, the invention can be utilized in any vehicle, and thus the discussion below can be generalized to apply to any form of a vehicular high-speed communications system.

Thus, a configuration plug is provided in a form of a box structure that comprises a lightweight and efficient construction for bringing together a plurality of feeds from ADBs and servers in a relatively small and accessible space. This permits an easy connection to be performed between the server outputs and the ADBs at a common location and is very flexible and adaptable to differing desired schematic designs. Thus, if the customer wants to upgrade or change the quality of service, add or remove servers, and optimize the distribution after entry into service, then the flexible configuration plug permits this to be implemented and optimized in a simple manner. Furthermore, redundancy and other failure mode features can be easily implemented in the event of a server or ADB failure, and mistakes are easily resolvable. Non-recurring engineering efforts are eliminated over the traditional point designs and design and implementation lead times are significantly reduced.

Accordingly, a multimedia delivery system of a vehicle is provided comprising: a plurality of multimedia servers comprising multimedia data files; a plurality of end user display devices that display information from the multimedia servers; a configuration plug designed as a line-replaceable unit comprising: a frame; one or more covers connected to the frame; a plug mount comprising an end-user device plug and a server plug, wherein both the device plug and the server plug each contain a plurality of cable connectors; a plurality of cables, each connecting to a connector of the device plug on one end, and a connector of the server plug on an other end, the connections defining a cable mapping between the devices and the servers, wherein the mapping is readily reconfigurable by service technicians.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain features of the invention.

DETAILED DESCRIPTION OF THE PREFERRED EMBODIMENTS

Figure 1:
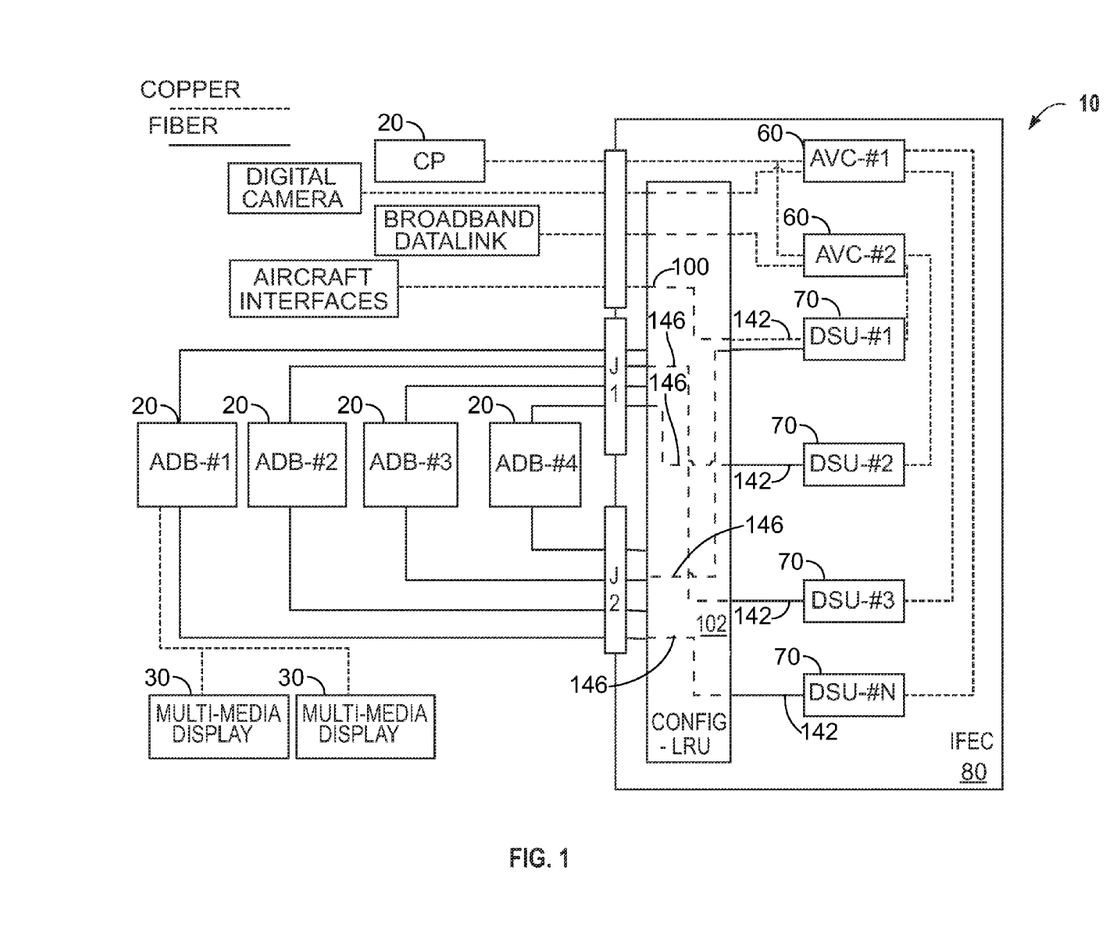
FIG. 1 is a block diagram illustrating the basic system components.

FIG. 1 is a block diagram that illustrates a basic embodiment of the invention. The exemplary system 10 comprises a content provider 20 that provides multimedia data from some external source to audio-video controllers 60 (AVC-D1, AVC-D2) that in turn are connected to digital server units 70 (DSU-D1, DSU-D2 for AVC-D1, and DSU-D3, DSU-D4 for AVC-D2).

These digital server units 70 are connected to area distribution boxes 40 (ADB1-ADB4) via a passive configuration plug 100 which is designed as a line-replaceable unit (LRU); the line-replaceable units are those that are designed to be replaced quickly at the flightline or airport ramp by service technicians—they do not require extensive disassembly operations for installing, removing, or updating. Ideally, in a preferred embodiment, the configuration plug 100 is designed in accordance with standard avionics packaging, e.g., for compatibility with the ARINC 600 standard.

The configuration plug can sit within the in-flight entertainment center 80 (IFEC), generically described as a cabinet unit, which comprises the audio-video controllers 60. The ADBs 40 interface with the configuration plug 100 via connectors J1, J2. The configuration plug 100 has ADB plugs 146 for interfacing with the ADBs 40, and server plugs 142 for the connection that ultimately goes to the servers 20. Within the configuration plug 100, fiber optic cables 102 are routed between the ADB plugs 146 and the server plugs 142 in order to establish the proper connection. The signals are routed from the ADBs 40 to the individual displays 30. The ADB plug 146 herein should be understood as ultimately being associated with a display device 30 of the end user, and although the area distribution box is utilized in a preferred embodiment, the cables could potentially be routed through to the end display devices without the use of an ADB 40. The term end-user device plug 146 is used generically as a form of the ADB plug 146, and would encompass both systems that comprise and do not comprise an ADB 40. It should be further noted that the connection between the ADB 40 and the display device 30 could include intermediary devices such as a Seat Electronics Box (SEB) (not shown).

In this configuration, extra fiber optics may be provided that are not used in any particular configuration. This can permit for future growth or reorganization, as the situation demands. In the exemplary typical embodiment, each ADB 40 has four fibers, so for six ADBs 40, there would be twenty-four fibers into going into the configuration plug 100, instead of twelve or fifteen that would go in, in the predetermined configuration according to the prior art. But the benefits of having the additional fibers far outweigh the additional burden that they impose, given that they only must extend for a few feet. This is the same situation for the servers. In an exemplary system, there are six servers, each having four fiber optic wires. In a dedicated configuration according to the prior art, only twelve or fifteen fibers might be run, but in this configuration, there are twenty-four. The additional weight and complexity in the IFEC rack 80 is nearly negligible.

Figure 2:
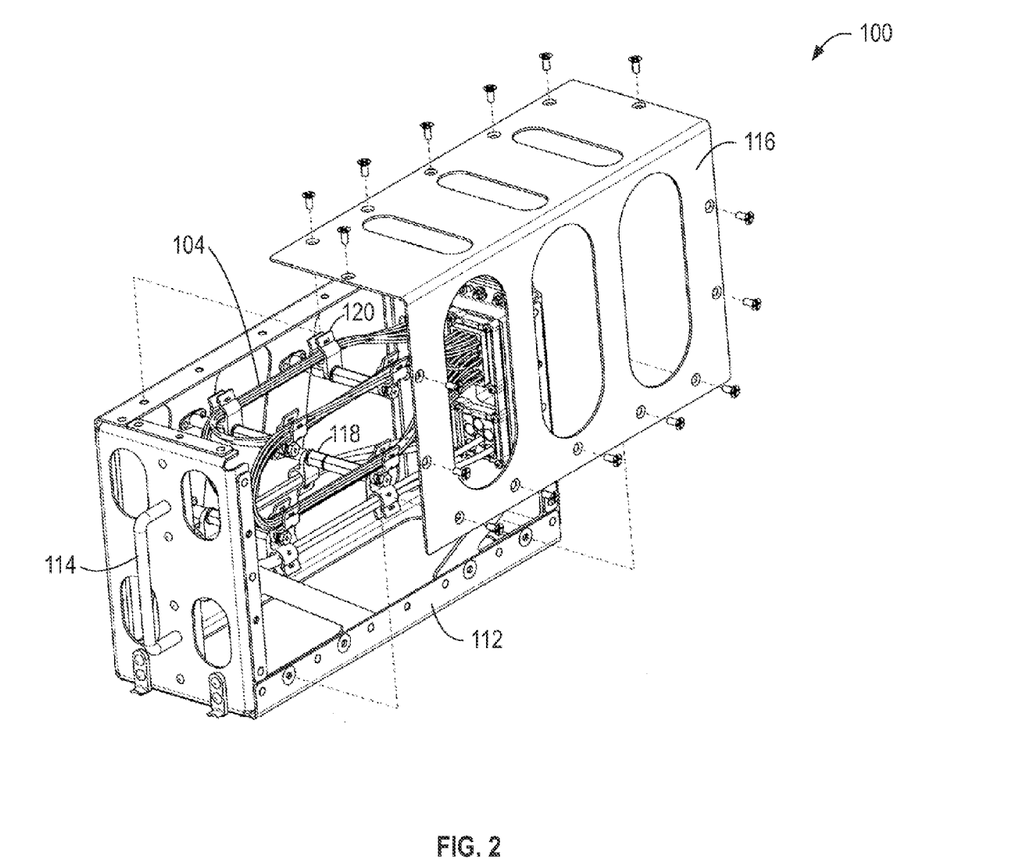
FIG. 2 is an isometric exploded view of an exemplary configuration plug.

FIG. 2 is an exploded perspective view that illustrates an exemplary rack design for the configuration plug 100. The design is sturdy and robust that helps fixedly mount the matching fiber optics in a manner that efficient, organized, and takes up little room. In this exemplary design, loose cables and connectors are not left laying around that could move about during operation of the vehicle.

As can be seen in FIG. 2, the configuration plug 100 comprises a sturdy frame 112 that has covers 116 affixed. Optionally, a handle 114 can be provided for easy removal and servicing of the unit. Fiber optic cable bundles 104 are illustrated as being held within a cable holder 120 mounted on a cable support member 118. In this way, the looping fiber optic cables 102 of the bundles 104 are firmly supported in a manner that minimizes inadvertent movement, as would be the case if the cables were joined together with a loose connector.

Figure 3:
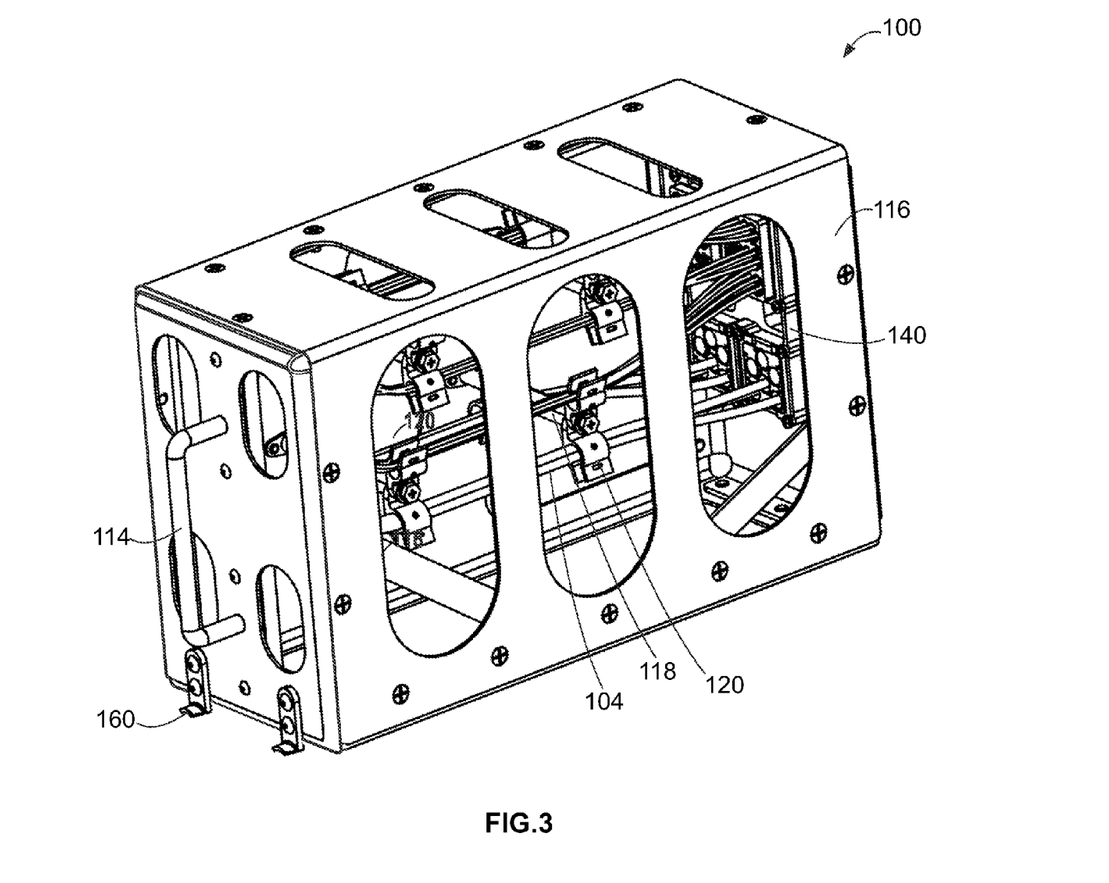
FIG. 3 is an isometric view of the assembled plug shown in FIG. 2.

FIG. 3 illustrates the configuration plug 100 shown in FIG. 2 in an assembled configuration. In this view, the cable holders 120 holding the cable bundles 104 can be clearly seen affixed to the cable support members 118. Additionally, the plug mount 140 that is used for the plugs (discussed below) can be seen. Additionally, it can be seen that the configuration plug 100 comprises retention clips 160 that may be used to securely affix the plug 100 within the IFEC rack 80, which further strengthens and stabilizes the interconnection point of all cables. Furthermore, the configuration plug 100 can make use of blind mate connectors to make installation and removal more simple.

Figure 4:
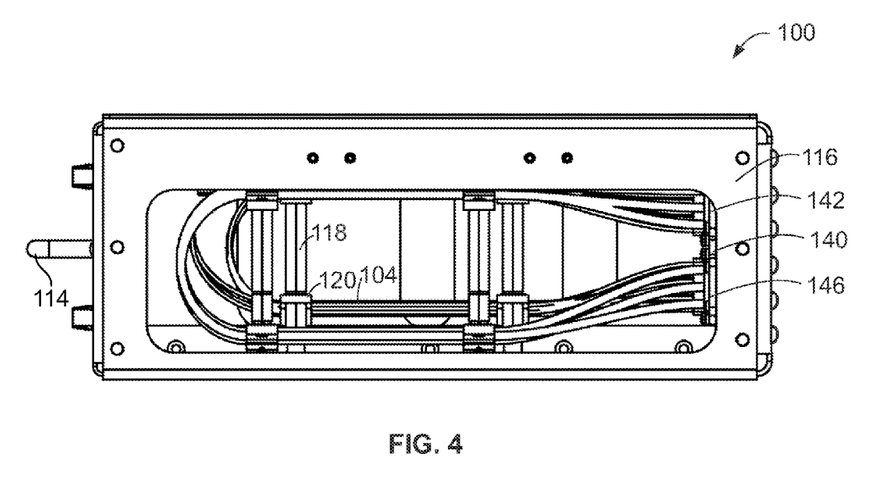
FIG. 4 is a bottom view of an assembled plug shown in FIG. 2.
Figure 5:
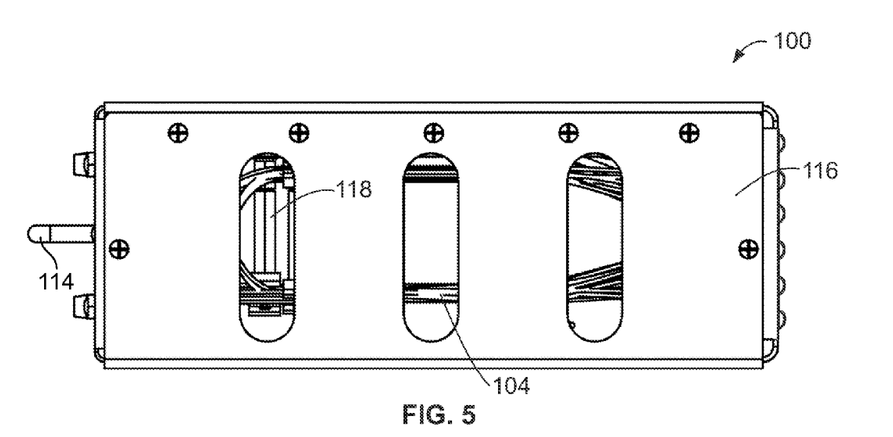
FIG. 5 is a top view of an assembled plug shown in FIG. 2.
Figure 6:
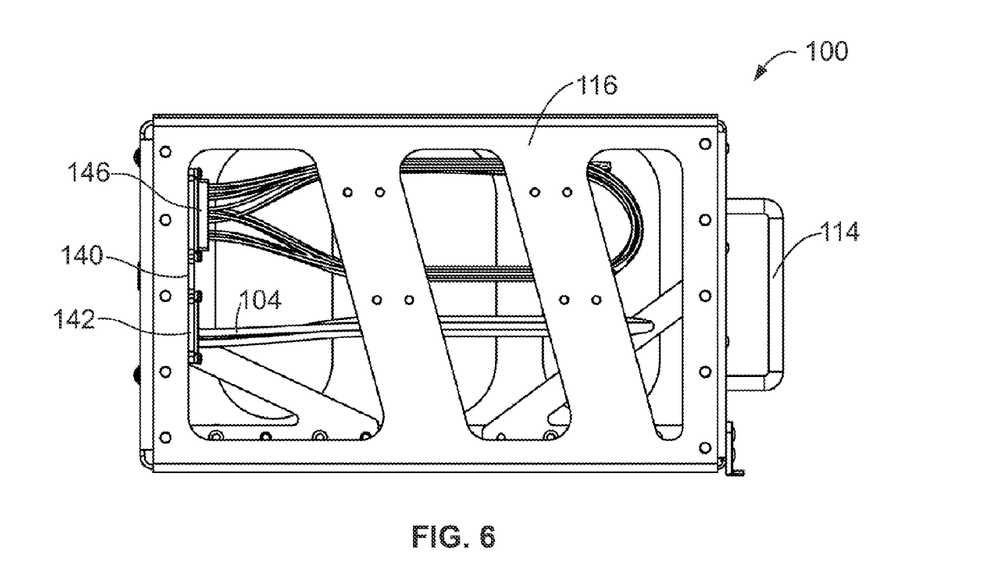
FIG. 6 is a side view of an assembled plug shown in FIG. 2.
Figure 7:
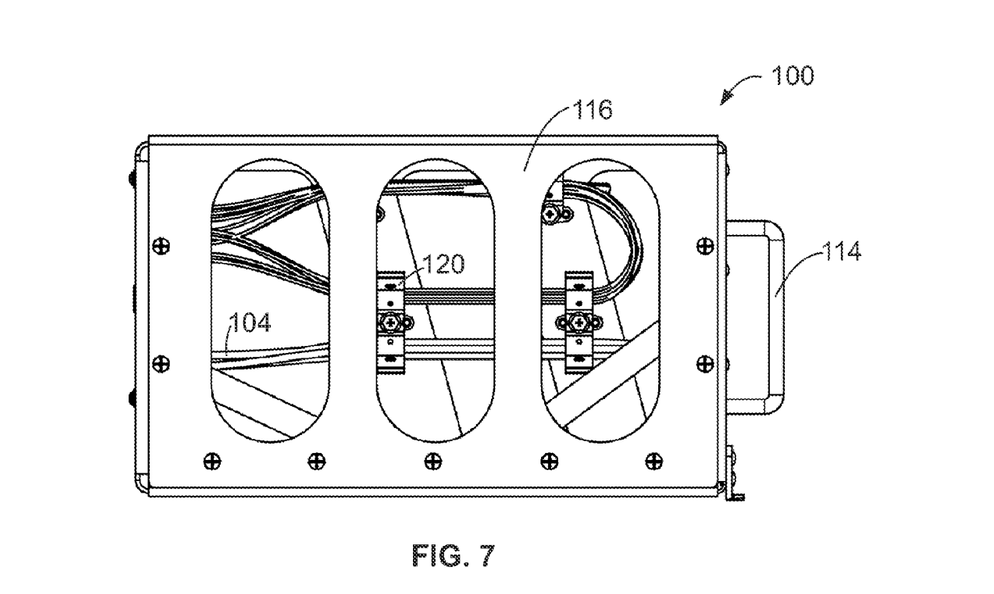
FIG. 7 is an opposite side view of an assembled plug shown in FIG. 2.

FIGS. 4 and 5 are top and bottom views that illustrate the different configurations for the covers 116 that can be utilized. In FIGS. 4 and 5, the server plug 142 and the ADB plug 146 can be seen in the plug mount 140 that is used for the interconnections. It should be noted that the plug mount 140 can be configured as a physically separate component, or can be simply a region on one of the covers to which the plugs 142, 146 are attached. FIGS. 6 and 7 are side views further illustrating cover 116 configurations as well as assembly aspects.

Figure 8:
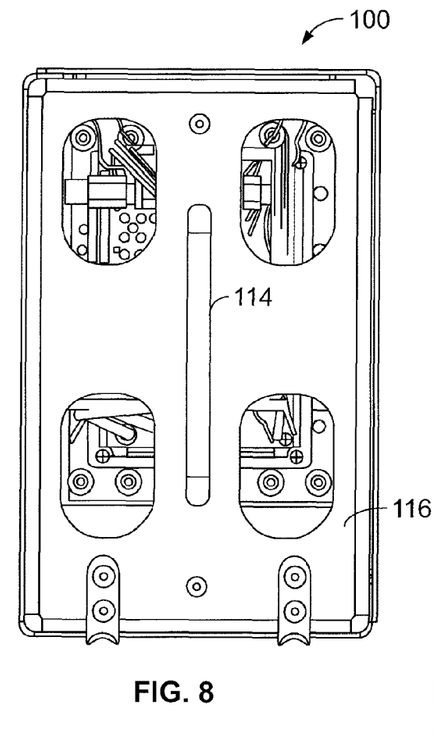
FIG. 8 is a rear view of an assembled plug shown in FIG. 2.
Figure 9:
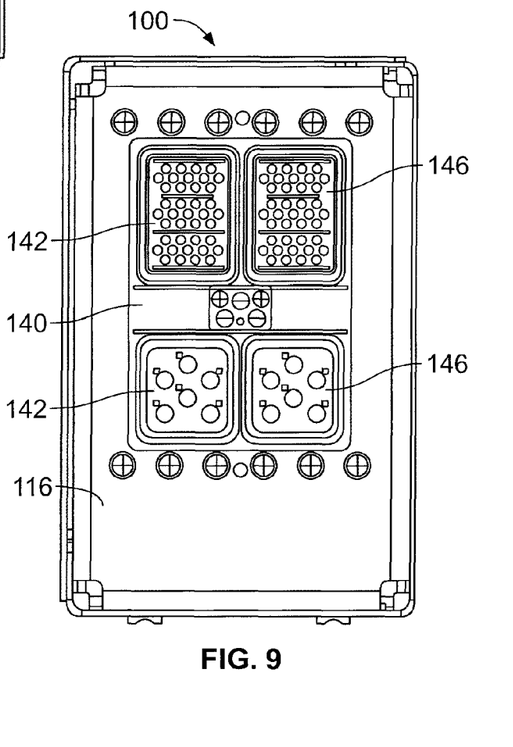
FIG. 9 is a front view of an assembled plug shown in FIG. 2.

FIGS. 8 and 9 are front and rear views of the configuration plug 100. FIG. 9 most clearly illustrates an exemplary plug mount 140 that is mounted within a cover 116, the plug mount comprising two different types of server plugs 142 and ADB plugs 146 that are affixed to the plug mount.

Figure 10:
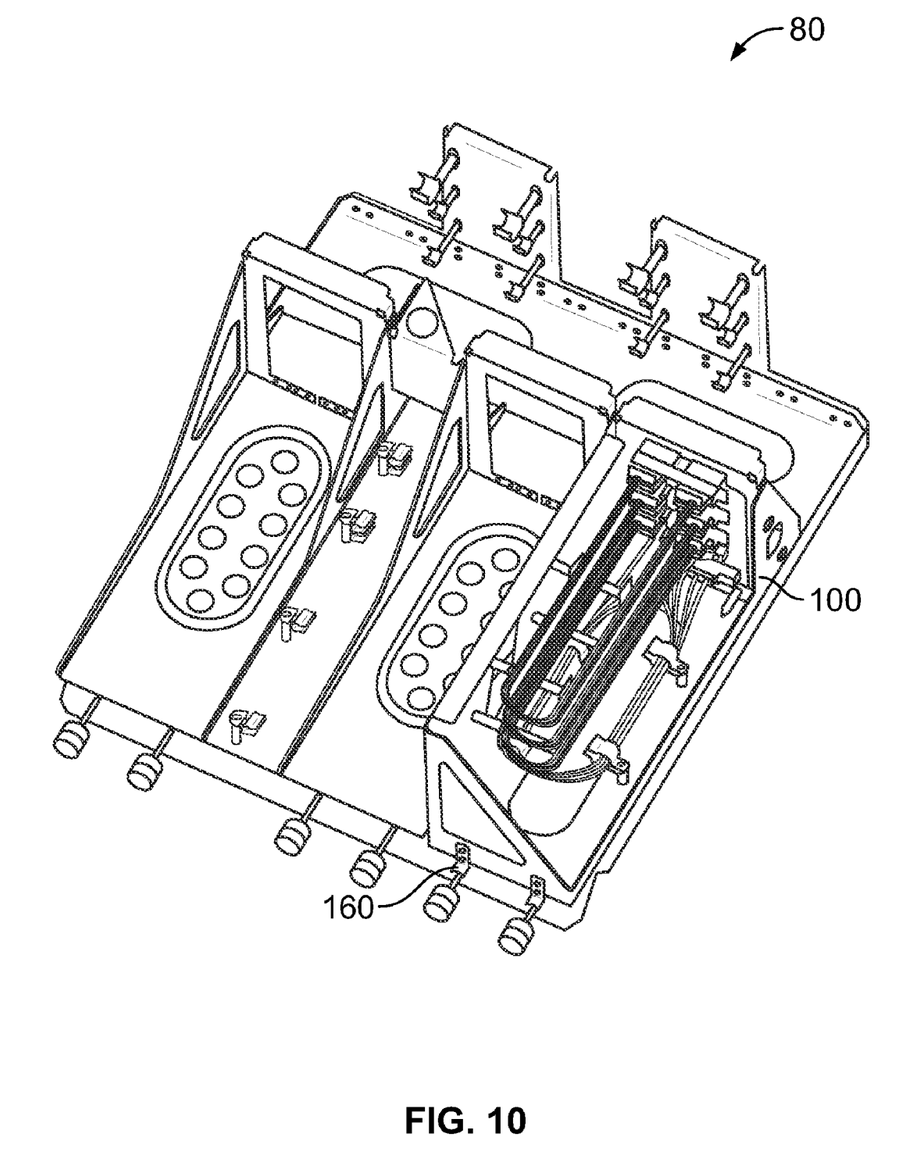
FIG. 10 is a pictorial isometric view of an in-flight entertainment center containing a configuration plug.

FIG. 10 is an isometric pictorial view of the configuration plug 100 mounted within the IFEC 80. As can be seen from the drawing, the IFEC 80 is designed to hold a plurality of configuration plugs 100—in this case, three. The configuration plug 100 may be mounted within the IFEC 80 using any suitable attachment mechanisms.

Figure 11:
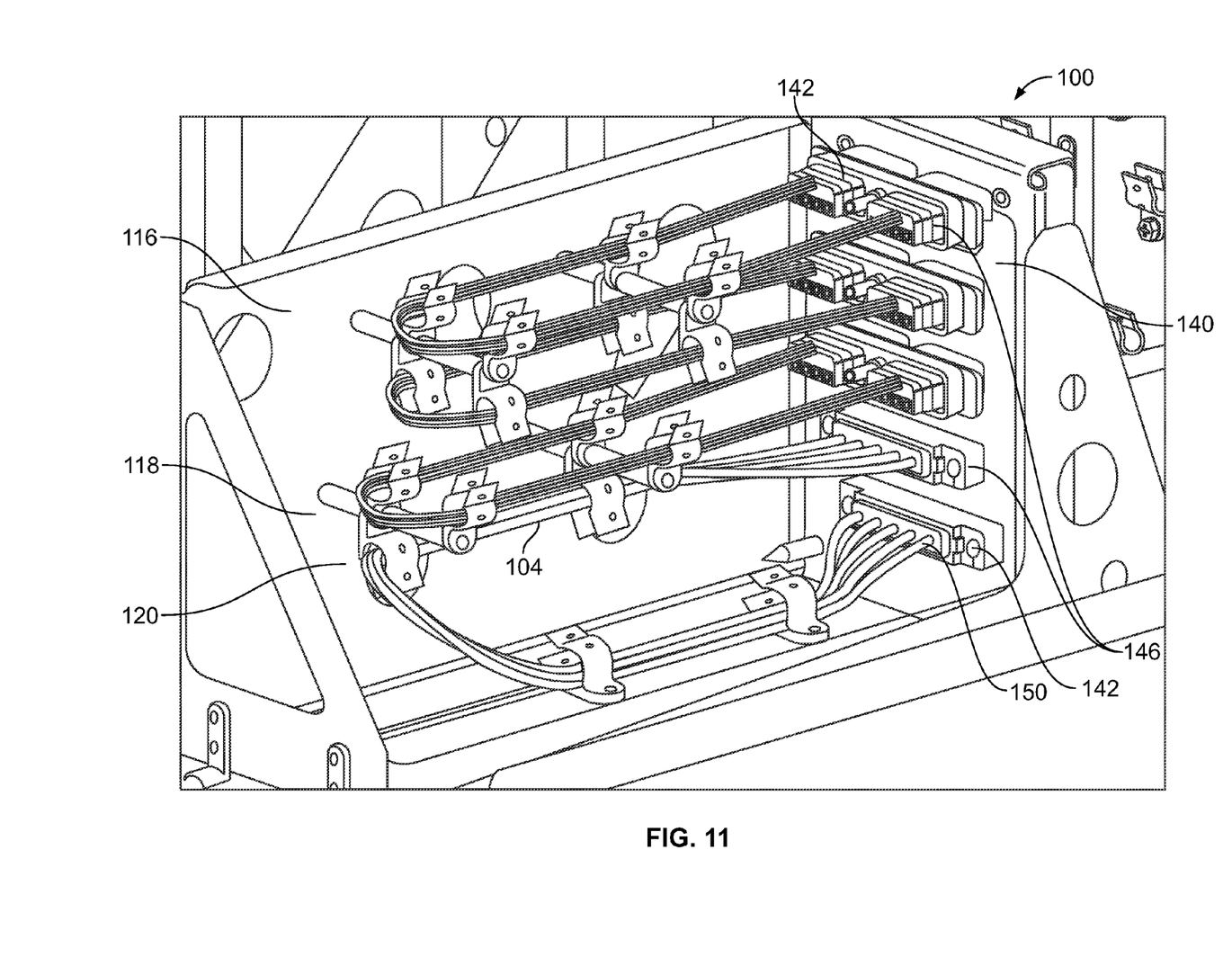
FIG. 11 is a pictorial isometric view of the configuration plug.

FIG. 11 is an isometric pictorial view of the configuration plug 100 having the top and side covers 116 removed. In this diagram, all of the primary components can be seen. The cable bundles 104 are seen terminating within the server plugs 142 and ADB plugs 146 respectively, these plugs 142, 146 having a plurality of fiber optic connectors 150 into which individual fiber optic cables 102 are provided. The cable bundles 104 are held within the cable holders 120 and supported by the cable support members.

In this way, a convenient, lightweight, sturdy, and durable mechanism is provided for efficiently configuring and reconfiguring a vehicle to handle a wide range of multimedia interfacing needs for vehicles.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. For example, the term "in-flight" is defined to include the meaning "in-operation" when the vehicle is not an aircraft. Although the use of fiber optics is preferred, the use of any suitable high-speed connector may be utilized, and such may be described generically as a "cable" herein.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

The word mechanism is intended to be used generally and is not limited solely to mechanical embodiments. Numerous modifications and adaptations will be readily apparent to those skilled in this art without departing from the spirit and scope of the present invention.

Table of Reference Characters
10 system
20 content provider
30 multimedia display
40 area distribution box (ADB)
50 virtual channel identifier (VCI)
60 audio-video controller (AVC)
70 digital server unit (DSU)
80 in-flight entertainment center (IFEC)
100 passive configuration plug-line replaceable unit (LRU)
102 fiber optic cable
104 fiber optic cable bundle
112 frame
114 handle
116 cover
118 cable support member
120 cable holder
140 plug mount
142 server plug
146 ADB plug/end-user display device plug
150 fiber optic/cable connection
160 retention clips

What is claimed is:

1. A configuration plug for interconnecting a plurality of multimedia servers, which comprise multimedia data files, to a plurality of end user display devices, which display information from the multimedia servers, of a multimedia delivery system of a vehicle, the configuration plug comprising:
    a frame;
    one or more covers connected to the frame and having an interior space that is enclosed by the one or more covers;
    a plug mount comprising a plurality of device plugs and a plurality of server plugs, wherein the device plugs contain a plurality of cable connectors that extend from the interior space of the configuration plug through the one or more covers for connection to exterior cables that extend to the end user display devices, and the server plugs contain a plurality of cable connectors that extend from the interior space through the one or more covers for connection to exterior cables that extend to the end user display devices; and
    a plurality of internal cables located within the interior space of the configuration plug, each of the internal cables electrically interconnecting one of the device plugs and one of the server plugs to collectively provide a cable mapping between the end user display devices and the multimedia servers, wherein the mapping between the end user display devices and the multimedia servers is reconfigurable by replacing the configuration plug with another configuration plug having different electrical interconnections provided by the internal cables between the device plugs and the server plugs.

2. The configuration plug according to claim 1, wherein the configuration plug resides in an airplane, and is replaceable with another configuration plug while the airplane is at a flightline or airport ramp.

3. The configuration plug according to claim 1, wherein at least one of the internal cables comprises a fiber optic cable.

4. The configuration plug according to claim 3, wherein at least one of the internal cables comprises a copper cable.

5. The configuration plug according to claim 1, wherein:
    the cable connectors of the device plugs are directed connected via the respective external cables to an area distribution box which is connected to the end user display devices.

6. The configuration plug according to claim 1, further comprising:
    a plurality of cable support members mounted to the frame and/or the one or more covers to support the internal cables.

7. The configuration plug according to claim 1, further comprising:
    a cable holder mounted to the frame and/or the one or more covers to hold at least a sub-plurality of the plurality of the internal cables.

8. The configuration plug according to claim 1, wherein the plug mount is configured as an element that is physically separate from the one or more covers prior to assembly, and that is affixed to one of the one or more covers during assembly.

9. The configuration plug according to claim 1, wherein the configuration plug design complies with the ARINC 600 standard.

10. The configuration plug according to claim 1, further comprising retention clips that affix the configuration plug to a cabinet unit rigidly mounted within the vehicle.

11. The configuration plug according to claim 1, wherein the configuration plug contains only passive components.

12. The configuration plug according to claim 1, wherein the configuration plug has no power supply interface that supplies power for operation of any components of the configuration plug.

13. The configuration plug according to claim 1, wherein the internal cables reside entirely within the interior space enclosed by the one or more covers.

14. The configuration plug according to claim 1, further comprising a handle extending from one of the one or more covers, wherein the handle is configured to be grasped by a hand during removal of the configuration plug from the vehicle.

* * * * *